Figure 1:
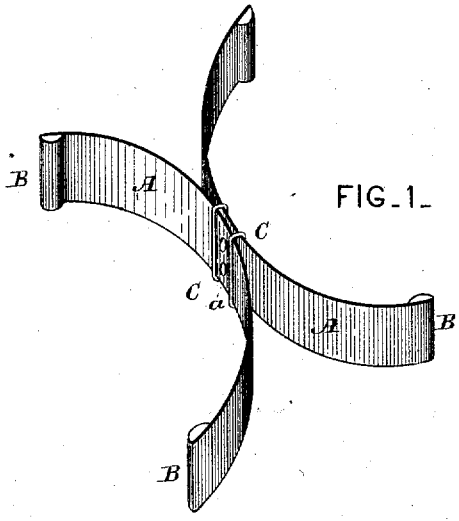

2 Sheets—Sheet 1.

S. D. WEBB.

Assignor, by mesne assignments, of two-thirds to S. C. HILL.

GALLEY TYPE LOCK.

No. 10,424. Reissued Dec. 11, 1883.

ATTEST.

Geo. T. Smallwood.

J. Henry Kaiser.

INVENTOR

Samuel D. Webb.

by Geo. C. Maxwell Intire

N. PETERS, Photo-Lithographer, Washington, D. C.

2 Sheets—Sheet 2.

S. D. WEBB.

Assignor, by mesne assignments, of two-thirds to S. C. HILL.

GALLEY TYPE LOCK.

No. 10,424. Reissued Dec. 11, 1883.

ATTEST.

Geo. T. Smallwood.

J. Henry Kaiser.

INVENTOR.

Samuel D. Webb.

by Wm. C. W. Entire

Atty.

N. PETERS, Photo-Lithographer, Washington, D. C.

UNITED STATES PATENT OFFICE.

SAMUEL D. WEBB, OF WASHINGTON, D. C., ASSIGNOR, BY MESNE ASSIGNMENTS, OF TWO-THIRDS TO SAMUEL C. HILL, OF SAME PLACE.

GALLEY TYPE-LOCK.

SPECIFICATION forming part of Reissued Letters Patent No. 10,424, dated December 11, 1883.

Original No. 274,681, dated March 27, 1883. Application for reissue filed November 15, 1883.

*To all whom it may concern:*

Be it known that I, SAMUEL D. WEBB, a citizen of the United States, residing at Washington, in the District of Columbia, have invented certain new and useful Improvements in Galley Type-Locks; and I do hereby declare the following to be a full, clear, and exact description of the invention, such as will enable others skilled in the art to which it appertains to make and use the same.

My invention relates to improvements in galley type-locks, and is designed to supply a simple and cheap substitute for quoins and other apparatus heretofore used for locking the type in the galley.

The invention consists of curved springs, made either from wire or flat metal or other preferred material, attached firmly together at their central convex snrfaces by rivets or bands, so that their ends may work in the same plane. When wire is used, the ends of the springs are bent into folds to furnish bearings of sufficient width. When flat springs are used, their ends are either folded back, forming rounded ends, or, as I prefer to make them, the ends are furnished with tips, being made flat on the convex sides of the springs and convex on the opposite sides. These tips prevent abrasion of the galley and side-stick by the springs. To regulate the action of the lock, I apply two loose bands or clasps—one on each side of the riveted center, and embracing both springs. These are slipped along on the springs when their ends are forced together and hold them in place. The edges of the springs may be notched to prevent the clasps from slipping back until released. I also accomplish the same result by making slots along the springs from near the fixed center toward each end, then put through these slots and over the notched edges of the springs two small rings, operating in the same manner as those first mentioned, or, instead of rings, short broad-headed bolts to work in the slots, the sides of the springs in this case being indented to retain the bolt in position.

My invention is fully illustrated in the accompanying drawings, forming a part of this specification, in which—

Figure 2:
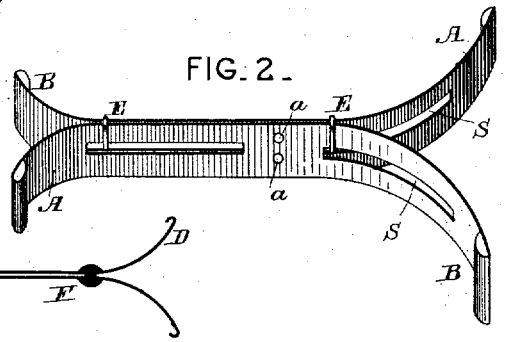
Figure 3:
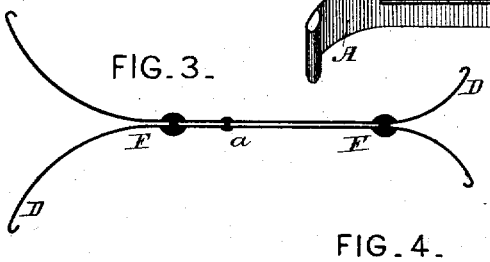
Figure 4:
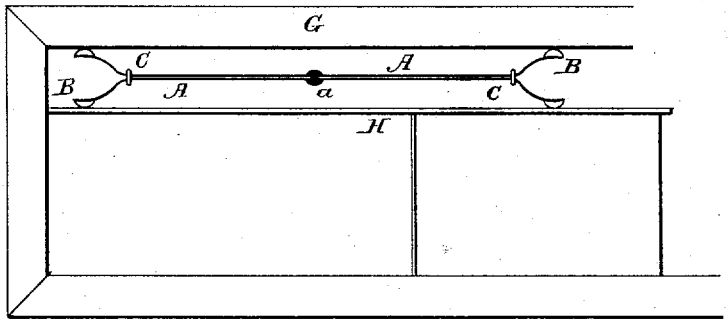
Figure 6:
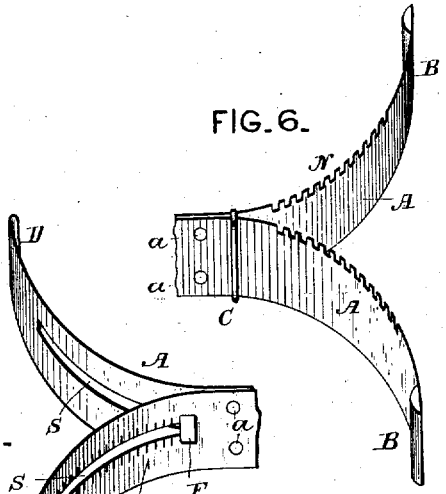
Figure 5:
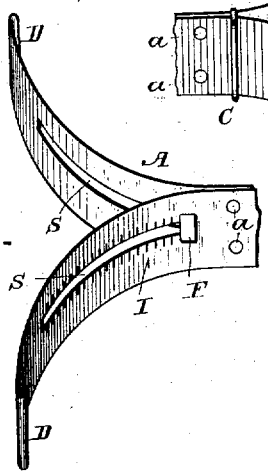
Figure 7:
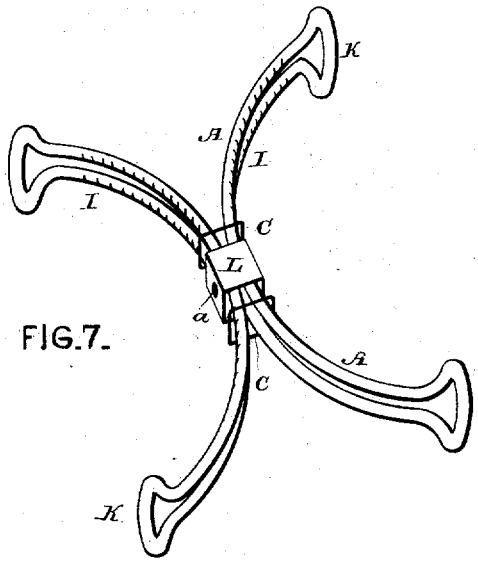

Figure 1 represents in perspective that form of my invention in which tips are used on the ends of the springs and clasps embrace both springs. Fig. 2 is a view in perspective of my lock having the longitudinal slots and the short sliding clasp, one of them in operation. Fig. 3 is a top view with the ends folded back to form tips, and having the sliding bolts in the slots. Fig. 4 shows the lock when applied to locking the type in the galley. Fig. 5 is an enlarged detailed view of part of the invention, as shown in Fig. 3. Fig. 6 represents a part of Fig. 1 enlarged, and shows the notches in the edges of the springs. Similar notches are used on the form shown in Fig. 2. Fig. 7 represents the lock formed of spring-wire and having the ends folded to form tips.

Similar letters refer to corresponding parts throughout the several views.

The letters A A in the drawings indicate the curved springs; *a a*, the rivets by which the flat springs are held together. B B are the rounded bearing-tips; D D, the tips formed by turning back the ends of the springs, and K K the tips of the wire lock, Fig. 7. S S are the slots. C C are the long clasps, and E E the short clasps, for regulating the action of the springs; and F F are bolts used for the the same purpose. N N are the notches in the edges, and I the indentations in the sides of the springs A A. A mere roughening may serve the purpose of the notches and indentations in many cases. L is the fixed clasp for binding the curved wire springs firmly together. The rivet or bolt *a* passes between the wire forming each spring.

The full power of the lock is required in making a proof from the form, but in justifying and correcting the form the pressure must be partially taken off, which is done by pushing the sliding clasp or bolt toward the ends of the springs.

I am aware that springs are used for tightening the type in the galley; but

What I claim as new, and desire to secure by Letters Patent, is—

1. A galley type-lock consisting of the combination of two springs of preferred dimensions, curved to the arc of a circle, riveted together at their central convex surfaces, working in the same plane, and two sliding clasps, all arranged substantially in the manner and for the purposes set forth.

2. A galley type-lock consisting of the combination of two springs of preferred dimensions, curved to the arc of a circle, riveted together at their central convex surfaces, working in the same plane, and having their edges suitably notched, plano-convex tips on the ends of said springs, and two sliding clasps, all arranged substantially in the manner and for the purposes set forth.

3. In a galley type-lock, the combination of two curved springs firmly connected together and working in the same plane, having longitudinal slots and indentations on the outer sides of the springs at right angles to and along the sides of said slots, and two sliding bolts working in said slots, substantially as set forth.

SAMUEL D. WEBB.

Witnesses:

DAVID H. MEAD,

CURTIS LAMMOND.